United States Patent [19]

Mack

[11] Patent Number: 5,069,283

[45] Date of Patent: Dec. 3, 1991

[54] FRACTURING PROCESS USING CARBON DIOXIDE AND NITROGEN

[75] Inventor: David J. Mack, Edmond, Okla.

[73] Assignee: The Western Company of North America, Fort Worth, Tex.

[21] Appl. No.: 388,672

[22] Filed: Aug. 2, 1989

[51] Int. Cl.$^5$ .......................................... E21B 43/26
[52] U.S. Cl. .................... 166/308; 166/309; 166/312
[58] Field of Search .............. 166/308, 309, 305.1, 166/311, 312

[56] References Cited

U.S. PATENT DOCUMENTS

| Re. 32,302 | 12/1986 | Almond et al. | 166/308 |
|---|---|---|---|
| 3,195,634 | 7/1965 | Hill | 166/308 |
| 3,310,112 | 3/1967 | Nielsen et al. | 180/65.6 |
| 3,396,107 | 8/1968 | Hill . | |
| 3,833,061 | 9/1974 | Gall . | |
| 3,898,165 | 8/1975 | Ely et al. . | |
| 3,918,524 | 11/1975 | Broaddus et al. | 166/308 |
| 3,937,283 | 2/1976 | Blauer et al. | 166/280 |
| 3,948,325 | 4/1976 | Winston et al. . | |
| 3,952,086 | 4/1976 | Trantham . | |
| 3,954,142 | 5/1976 | Broaddus et al. | 166/308 |
| 3,980,136 | 9/1976 | Plummer et al. | 166/280 |
| 3,981,363 | 9/1976 | Gall | 166/270 |
| 4,039,029 | 8/1977 | Gall . | |
| 4,212,354 | 7/1980 | Guin | 166/308 |
| 4,233,156 | 11/1980 | Allen | 166/256 |
| 4,239,629 | 12/1980 | Sauber | 166/307 |
| 4,313,834 | 2/1982 | Harris . | |
| 4,324,668 | 4/1982 | Harris | 166/307 |
| 4,436,156 | 3/1984 | Fredrickson | 166/308 |
| 4,440,653 | 4/1984 | Briscoe et al. | 166/308 |
| 4,460,627 | 7/1984 | Weaver et al. . | |
| 4,460,751 | 7/1984 | Hanlon et al. | 166/308 |
| 4,463,810 | 8/1984 | Hill | 166/308 |
| 4,477,360 | 10/1984 | Almond | 166/308 |
| 4,480,696 | 11/1984 | Almond et al. | 166/308 |
| 4,487,866 | 12/1984 | Almond et al. . | |
| 4,487,867 | 12/1984 | Almond et al. . | |
| 4,519,455 | 5/1985 | Holtmyer et al. | 166/308 |
| 4,524,829 | 6/1985 | Hanlon et al. . | |
| 4,532,052 | 7/1985 | Weaver et al. | 166/307 |
| 4,541,935 | 9/1985 | Constien et al. | 166/308 |
| 4,552,215 | 11/1985 | Almond et al. . | |
| 4,553,601 | 11/1985 | Almond et al. | 166/308 |
| 4,554,082 | 11/1985 | Holtmyer et al. . | |
| 4,606,772 | 8/1986 | Almond et al. . | |
| 4,622,155 | 11/1986 | Harris et al. | 166/308 |
| 4,627,495 | 12/1986 | Harris et al. | 166/308 |
| 4,701,270 | 10/1987 | Bullen et al. | 166/308 |

OTHER PUBLICATIONS

Kirk Othmer, Encyclopedia of Chemical Technology, John Wiley & Sons, 3rd Ed., vol. 4, pp. 725–728 (1978), "Carbon Dioxide-Physical Properties".

(List continued on next page.)

Primary Examiner—Ramon S. Britts
Assistant Examiner—R. J. Schoeppel
Attorney, Agent, or Firm—Richards, Medlock & Andrews

[57] ABSTRACT

A hydraulic fracturing process in which substantial quantities of both nitrogen and carbon dioxide are incorporated into the fracturing fluid. Nitrogen and carbon dioxide are separately incorporated into an aqueous based fracturing fluid in amounts to provide a volume ratio of nitrogen to carbon dioxide at wellhead conditions within the range of about 0.2–1.0. The volume ratio of the total of carbon dioxide and nitrogen to the aqueous phase of the aqueous fracturing fluid at wellhead conditions within the range of about 1–4. The aqueous fracturing fluid containing the nitrogen and carbon dioxide is injected in the well under a pressure sufficient to implement hydraulic fracturing of the subterranean formation undergoing treatment. A thickening agent may be incorporated into water to provide a viscous aqueous based fracturing fluid to which the carbon dioxide and nitrogen are added. The carbon dioxide is incorporated in liquid phase and the nitrogen in gaseous phase. Propping agent is incorporated into at least a portion of the fracturing fluid. Addition of the propping agent takes place prior to addition of the carbon dioxide and nitrogen.

26 Claims, 1 Drawing Sheet

OTHER PUBLICATIONS

Well Fracturing Operation in Oklahoma 5/22/87, The Western Co., see Supplemental Disclosure Statement.
Well Fracturing Operation in Oklahoma 8/14/87, The Western Co., see Supplemental Disclosure Statement.
Well Fracturing Operation in Oklahoma, 1/12/88, The Western Co. see Supplemental Disclosure Statement.
Well Fracturing Operation in Oklahoma 3/27/87, The Western Co., see Supplemental Disclosure Statement.
Well Fracturing Operation in Oklahoma 11/18/87, The Western Co., see Supplemental Disclosure Statement.
Well Fracturing Operation in Oklahoma 12/16/87, The Western Co., see Supplemental Disclosure Statement.

FRACTURING PROCESS USING CARBON DIOXIDE AND NITROGEN

FIELD OF THE INVENTION

This invention relates to the formation of fractures in subterranean earth formations and more particularly to hydraulic fracturing in which nitrogen and carbon dioxide are incorporated into fracturing fluids.

BACKGROUND OF THE INVENTION

It is a common practice to treat subterranean formations to increase the gross permeability or conductivity of such formations by procedures which are identified generally as fracturing processes. For example, it is a conventional practice to hydraulically fracture a well in order to produce one or more cracks or "fractures" in the surrounding formation by a mechanical breakdown of the formation. Fracturing may be carried out in wells which are completed in subterranean formations for virtually any purpose. The usual candidates for fracturing, or other stimulation procedures, are production wells completed in oil and/or gas containing formations. However, injection wells used in secondary or tertiary recovery operations, for example, for the injection of water or gas, may also be fractured in order to facilitate the injection of fluids in such subterranean formations.

Hydraulic fracturing is accomplished by injecting a hydraulic fracturing fluid into the well and imposing sufficient pressure on the fracturing fluid to cause the formation to breakdown with the attendant production of one or more fractures. The fracture or fractures formed may be horizontal or vertical with the latter usually predominating and with the tendency toward vertical fracture orientation increasing with the depth of the formation being fractured. Simultaneously with or subsequent to the formation of the fracture, a thickened carrier fluid having a propping agent such as sand or other particulate material suspended therein is introduced into the fracture. The propping agent is deposited in the fracture and functions to hold the fracture open after the pressure is released and the fracturing fluid withdrawn back into the well. The fracturing fluid usually contains a thickening agent in order to impart a sufficiently high viscosity to retain the propping agent in suspension or at least to reduce the tendency of the propping agent to settle out of the fluid.

Another common procedure for increasing the gross or apparent permeability of subterranean formations is acidizing. In this procedure, an aqueous solution of a suitable acid is injected into the well undergoing treatment under sufficient pressure to force it into the surrounding formation where it dissolves acid-soluble material in the formation to form small fissures or fractures. Carbonate-containing formations usually are treated with acidizing procedures and suitable acids for use in this regard are hydrochloric, formic and acetic acids. In some cases, however, sandstones containing little or no carbonate materials may be treated with acids such as hydrochloric or hydrofluoric acid or blends thereof.

Acidizing and hydraulic fracturing may also be employed in a common procedure. An acidizing fluid may be injected into the well under sufficient pressure to cause the formation to break down to produce fractures by hydraulic fracturing. This may be followed by a conventional nonacidic hydraulic fracturing fluid containing a propping agent or the acidizing fluid may itself contain a propping agent.

A number of additives may be employed in the course of a typical fracturing process. Thickening agents and propping agents are discussed above. In many cases, the initial portion of the fracturing fluid, referred to sometimes as a "pad" or "spearhead" will be free of propping agent and will be of a relatively low viscosity. Propping agent and thickening agent may be added to the portion of the fracturing fluid following the "spearhead". It is also conventional to employ a fluid loss additive in all or part of the fracturing fluid. In the case of hydraulic fracturing, the fluid loss agent minimizes the loss of fracturing fluid to the formation as the formation breakdown pressure is reached, thus aiding in the initiation of the fracture. In addition, once the fracture is formed, fracture propagation is enhanced by decreasing filtrate loss through the walls of the fracture into the formation matrix. It is also known in the art to incorporate a surfactant into at least a portion of the fracturing fluid to facilitate clean-up of the fracturing fluid at the conclusion of the stimulation operation. The surfactant functions to reduce the water-rock and oil-water interfacial tensions so that when the well is placed on production, the oil effectively displaces the water-based treating fluid from the formation matrix back into the well.

Other materials which may be incorporated with the more conventional fracturing liquids include normally gaseous materials which function to form a gas phase at the wellhead, or at the formation being fractured or both. One such process disclosed in U.S. Pat. No. 3,310,112 to Nielsen et al. involves the use of substantial quantities of liquid carbon dioxide in conjunction with a carrier liquid such as gelled water containing particulate propping agent. Very large quantities of carbon dioxide are employed in the Nielsen procedure to provide a ratio of at least 5 and preferably at least 7 volume units of carbon dioxide per volume of slurry of propping agent. The liquid carbon dioxide is converted in the formation to gas, due to pressure reduction when the wellhead pressure is released and the fact that the formation usually will be above the critical temperature of carbon dioxide. Upon releasing the pressure, a substantial portion of the gelled liquid is carried back out of the well by the gaseous carbon dioxide.

U.S. Pat. No. 3,937,283 to Blauer discloses a hydraulic fracturing process employing a foam formed of a gas such as nitrogen, carbon dioxide, air or hydrocarbon gases and a liquid such as water or an oil base liquid. The foam is characterized as having a Mitchell quality within the range of 0.5236–0.9999 and preferably between the range of 0.60–0.85.

U.S. Pat. No. 4,480,696 (Re 32,302) to Almond et al. discloses a water-carbon dioxide fracturing fluid characterized as an emulsion of liquified carbon dioxide and water at surface conditions which is converted into a gas and liquid foam upon heating in the formation to a temperature above the critical temperature of the carbon dioxide. The fracturing fluid contains a surfactant to stabilize the emulsion and the resulting foam and also gelling agents as well as propping agents. The volumetric ratio of liquid carbon dioxide to aqueous fluid is described as being in the range of 1:1 to about 20:1, preferably about 2:1 to 18:1, and the foam having a Mitchell quality of about 50% to an excess of about 96%.

A gelling agent such as a natural or synthetic hydratable polymer may be mixed with the aqueous liquid prior to formation of the emulsion. An inhibitor which functions to retard the hydration rate and therefore delay a viscosity increase in the solution may be employed. Compounds containing multivalent metals which release metal ions in aqueous solution to function as cross-linking or complexing agents for the hydratable polymer may be employed as inhibitors. A propping agent is added to the gelled aqueous liquid followed by admixing with the liquid carbon dioxide. As the fracturing fluid is introduced into the subterranean formation, the fluid is heated to above the critical temperature of carbon dioxide to produce a foam which maintains the viscosity of the fracturing fluid. After fracturing of the formation, the well is shut in for a stabilization period and then opened under controlled conditions to provide a pressure drop which causes the foam to break. The carbon dioxide gas functions to produce liquids from the fracturing area to leave the formation clean and ready for the commencement of production.

SUMMARY OF THE INVENTION

In accordance with the present invention, there is provided a hydraulic fracturing process in which substantial quantities of both nitrogen and carbon dioxide are incorporated into the fracturing fluid. More specifically, nitrogen and carbon dioxide are incorporated into an aqueous based fracturing fluid in amounts to provide a volume ratio of nitrogen to carbon dioxide at wellhead conditions within the range of about 0.2–1.0, and more usually 0.2–0.8. Preferably, the cumulative amounts of nitrogen and carbon dioxide are such as to provide a volume ratio of carbon dioxide and nitrogen to the aqueous phase of the fracturing fluid at wellhead conditions which is within the range of about 1–4. The aqueous fracturing fluid containing the nitrogen and carbon dioxide is injected in the well under a pressure sufficient to implement hydraulic fracturing of the subterranean formation undergoing treatment.

Preferably, a thickening agent is incorporated in the water to provide a viscous aqueous based fracturing fluid to which the carbon dioxide and nitrogen are added. The carbon dioxide is incorporated in liquid phase and the nitrogen in gaseous phase and in an amount to provide a nitrogen concentration of 15 volume percent. Propping agent is incorporated into at least a portion of the fracturing fluid. Addition of the propping agent normally takes place prior to addition of the carbon dioxide and nitrogen.

More preferred volumetric ratios of nitrogen to carbon dioxide at the wellhead conditions are within the range of 0.3–0.6. The total amount of carbon dioxide and nitrogen is added to the water to provide a volume ratio of carbon dioxide and nitrogen to water at the wellhead within the range of 1.5–3.0.

DETAILED DESCRIPTION

As noted previously, gases such as nitrogen or carbon dioxide have been incorporated into hydraulic fracturing fluids in order to provide a downhole gaseous phase while at the same time functioning as a portion of the carrier liquid for propping agent as the fluid is pumped down the well and into the formation. The present invention employs nitrogen and carbon dioxide together and involves the incorporation of substantial quantities of nitrogen into an aqueous fracturing fluid. By the term aqueous fluid as used herein, is meant an aqueous medium formed of water or one or more water miscible liquids which may be incorporated into the fracturing fluid. For example, water miscible low molecular weight aliphatic alcohols such as methanol, ethanol, isopropyl alcohol or tertiary butyl alcohol may be incorporated into the aqueous based fracturing fluid in order to prevent hydration of clays in relatively dry formations such as natural gas reservoirs. Such alcohols provide fundamentally aqueous based fluids in the sense of the incorporation and hydration of polymeric thickening agents, the inclusion of surfactants and fluid loss control agents and the like, as well as the inclusion of the carbon dioxide and nitrogen, but they do not cause the hydration and swelling of formation clays. The alcohols also function as good clean-up agents in effectively displacing hydrocarbon fluids. Usually, alcohol, principally methanol or isopropyl alcohol, is used as a minor component of the aqueous liquid. Substantially, pure alcohol can be used but this would be a rare occurrence because of cost and safety conditions due to the flammability of alcohols such as methanol.

As will be recognized by those skilled in the art, carbon dioxide is highly soluble in water and in the liquid phase can be incorporated into the water in substantial quantities to provide a solution or dispersion with the water. Nitrogen, however, is relatively insoluble, ranging usually from less than about 0.3 wt. % at wellhead conditions to even lower solution concentrations at the substantially higher temperatures normally encountered at the bottom of a well. Notwithstanding the dissimilar characteristics of nitrogen and carbon dioxide, these two gases are used together in the present invention, and moreover, the nitrogen is used in a substantial amount, typically resulting in a decrease in carbon dioxide from the normal amount. The invention provides for effective "clean up" of the well at the conclusion of the fracturing process and reduces scale formation which is attendant to the presence of large quantities of carbon dioxide. Moreover, the relatively high amount of nitrogen in conjunction with the carbon dioxide and water functions as an effective carrier liquid for propping agent. The nitrogen is inert in the liquid phase and by reducing the carbon dioxide content, stability of the thickened aqueous phase is enhanced as is stability of the foam. While the invention is not to be limited by theory, it is believed that by using a relatively high nitrogen content, and correspondingly less carbon dioxide, acid hydrolysis of the polymeric thickening agent is minimized, thus enhancing the life of the thickened aqueous phase, resulting in better and longer suspension of the propping agent. Also, reduced carbon dioxide content minimizes acid hydrolysis of the foaming agent, resulting in better foam stability.

The process of employing both carbon dioxide and nitrogen in accordance with the present invention may be illustrated by reference to a typical hydraulic fracturing operation. In most hydraulic fracturing, the initial fracturing fluid injected into the well usually will be free of a propping agent and may be of a somewhat lower viscosity than the fluid subsequently injected. As the initial fracturing fluid is pumped into the well and reaches the zone of the well adjacent to the formation to be fractured, a high pressure is established at the face of the formation due to the fact that the fluid loss from the well into the formation is less than the rate at which the fluid is being introduced into the well. As the pumping operation continues, the pressure at the face of the formation ultimately reaches the so-called "formation breakdown pressure" at which time the formation is mechanically ruptured and one or more fractures are formed. The initiation of a fracture in the formation usually is accompanied by a relatively abrupt and substantial decrease in pressure which is sensed at the wellhead. Thereafter, the pressure at the wellhead remains fairly constant as the fracture is extended deeper into the formation by the continued injection of fracturing fluid into the well.

In some hydraulic fracturing procedures, the initial fracturing fluid is an aqueous solution of an acid, typically a mineral acid such as hydrochloric acid. In other cases a neutral fluid such as water or 2 weight percent sodium or potassium chloride solution may be employed. In either case, the initial fluid will usually be free of propping agent and may be of a relatively low viscosity in order to provide good initial penetration into the formation. The fracturing fluid injected subsequent to the initial "spearhead" or "pad" fluid will be provided with a propping agent such as "frac sand" and treated with a thickening agent in order to provide a viscosity capable of retaining the propping agent in suspension as it is pumped down the well and into the fracture. A typical propping agent is 12–20 or 20–40 mesh Ottawa frac sand which may be employed in concentrations ranging from about 0.5 to 20 pounds of sand per gallon of fracturing fluid. Another suitable propping agent takes the form of sintered ceramic particles in the aforementioned size ranges. Thickening agents which may be employed to increase the viscosity of the aqueous solutions include natural or synthetic polymeric materials such as natural gums and synthetic polyelectrolytes as described in greater detail below. This portion of the fracturing fluid may be thickened to provide any desired viscosity, normally within the range of about 10 to 100 centipoises at a shear rate of about 170 sec$^{-1}$ but sometimes ranging up to 300 centipoises. Unless otherwise indicated, viscosity values are presented herein at 170 sec$^{-1}$. The propping agent concentration may be progressively increased during this stage of the operation.

Subsequent to the injection of the propping agent into the fracture, it is desirable to complete the operation with the injection of a flushing fluid which is free of propping agent or in which the propping agent is progressively decreased. This flushing fluid functions to displace previously injected propping agent into the fracture and reduces the accumulation of undesirable quantities of propping agent within the well proper. At the conclusion of the fracturing operation, the well is swabbed or otherwise placed on production in order to reverse the pressure gradient established adjacent to the well and produce the injected fluids back into the wellbore.

The nitrogen and carbon dioxide may, in accordance with the present invention, be added to the aqueous fracturing fluid at one or more of the above stages of operation. For example, the liquid used during the earliest stage of the operation may be an aqueous hydrochloric acid solution, brine or plain water having a viscosity of about one centipoise, i.e., containing no polymeric thickening agent, or having a higher viscosity by virtue of the addition of a thickening agent. Propping agent normally will not be present here but nitrogen and separately added liquid carbon dioxide may be incorporated into the propping-agent free liquid used at this stage of the operation and will result in viscosity enhancement with or without the addition of a polymeric thickening agent.

At the conclusion of this "spearhead" or "pad", the aqueous based fracturing fluid containing nitrogen and separately added liquid carbon dioxide and also containing propping agent is injected down the well. The viscosity of the fluid at this stage of operation will normally be greater than that of the spearhead fluid, either by virtue of the addition of thickening agent or, if the polymer concentration is the same here as in the preceding stage, the addition of propping agent will normally result in a substantially increased viscosity. At the conclusion of the displacement of propping-agent containing fluid, the fracturing operation normally is concluded by the injection of a flushing fluid to displace the propping agent into the fracture and the well may be shut in for a period of time to allow the injected fluid to reach or approach an equilibrium state. The flushing fluid preferably also contains nitrogen and separately added liquid carbon dioxide within the volume parameters described herein. Where the flushing or displacing fluid injection step is the final step of the process, the well is then shut in to allow the injected fluids to reach or approach an equilibrium state in which, in the normal course of events, the carbon dioxide as well as the nitrogen will be in the gaseous phase. The shut in period before placing the well on production may vary from periods of less than one hour to periods of perhaps 3–6 hours depending upon the formation and operating conditions. For example, in the unlikely event, the formation is near or only marginally above the critical temperature of carbon dioxide, the shut-in period will probably be longer than for those cases in which the formation temperature is well above the critical temperature of carbon dioxide. In either case, when the well is placed on production by reducing the well pressure and providing for a positive pressure gradient extending from the formation into the well, the co-mingled nitrogen and carbon dioxide function to effectively displace the aqueous fracturing fluid from the formation into the well bore.

The nitrogen, because of its low solubility in water, or in hydrocarbon fluids which may be present in the formation, exists almost exclusively as a separate gas phase and thus provides an immediate driving force for rapid and effective expulsion of the fracturing fluids from the formation into the well when the pressure gradient is reversed. This, together with reduction in the tendency to scaling occasioned by the presence of carbon dioxide, provides for good clean-up characteristics at the conclusion of the fracturing operation. The use of both nitrogen and carbon dioxide provides for a two-stage clean-up process in which the nitrogen gas initially acts to dispel fluids from the formation. As the role of nitrogen in this process diminishes, the role of carbon dioxide becomes more pronounced. At the conclusion of the clean-up period, the gaseous carbon dioxide acts to expel fluids from the formation.

The amounts of nitrogen and carbon dioxide incorporated into the fracturing liquid at the wellhead depends upon the relative amounts of these gases desired at the bottom hole conditions and also the amount of the gaseous energizing phase (carbon dioxide and nitrogen) relative to the fracturing liquid phase. It often will be desirable to provide a system at reservoir conditions of about ⅔ energizing phase and about ⅓ liquid phase, roughly equivalent to a Mitchell foam quality, as defined in the aforementioned patent to Blauer et al., of about 65-70%. A desirable makeup of the energizing phase at reservoir conditions is about 1 volume part nitrogen to 2 volume parts carbon dioxide. These ratios may, of course, change depending on reservoir conditions, the nature of the fracturing liquid and the like. For example, where scale formation is a serious problem, a somewhat larger amount of nitrogen may be desirable.

As will be recognized by those skilled in the art, the nitrogen and carbon dioxide will undergo volume changes between the surface conditions and the reservoir conditions and these should be taken into account in formulating the makeup of the fracturing fluid at wellhead conditions. Changes in the volume of nitrogen, which is in the gas phase at both the surface and subsurface conditions, will conform closely to the General Gas Law equation. Usually, the nitrogen volume will decrease somewhat from surface to downhole conditions, although as indicated hereinafter increases in nitrogen volume can occur, for example in the case of high temperate wells, and where there is a very high flowing pressure gradient down the well tubulars. Changes in carbon dioxide volume from the surface to the reservoir conditions will occur due to expansion occasioned by the phase change and also because of changes in pressure and temperature, following the Gas Law equation. In general, the carbon dioxide volume will undergo volumetric expansion although in relatively high pressure, cool reservoirs there may be no expansion and even some contraction of carbon dioxide volume.

As noted previously, the volume ratio of nitrogen to carbon dioxide at wellhead conditions is within the range of about 0.2-1.0, preferably 0.2-0.8, and more preferably within the range of 0.3-0.6. The ratio of the energizing phase (nitrogen and carbon dioxide) to the fracturing liquid (including thickeners and surfactants, but not including the propping agent) is normally within the range of about 1-4. Where the ratio of the energizing phase to the fracturing liquid phase is near the upper end of the aforementioned range, it usually will be desirable to use greater amounts of nitrogen and reduced amounts of carbon dioxide, i.e. the nitrogen/carbon dioxide ratio will tend to increase as the ratio of the energizing phase to the liquid fracturing phase increases.

Downhole conditions, especially pressure, are in a transient state in the course of the fracturing operation. For design purposes, the downhole temperature and pressure conditions may be determined based upon downhole pressure and temperature conditions as determined by well shut-in tests or other procedures which will provide a reliable basis upon which to estimate the pressure and temperature conditions immediately adjacent the well.

Using these designed criteria, it usually will be preferred to provide a ratio of energizing phase to liquid phase at the downhole conditions within the range of about 1.5-2.5. The relative volume amount of the energizing phase from the wellhead to the downhole conditions will usually decrease somewhat and accordingly it will be preferred to provide at the wellhead conditions a volume ratio of carbon dioxide and nitrogen to water within the range of about 1.5-3.0. The more preferred volume ratio of nitrogen to carbon dioxide at the wellhead conditions is within the range of about 0.3-0.6. It will usually be desirable to observe the constraints described previously with respect to energizing phase/water ratio and the nitrogen/$CO_2$ ratio. That is, where the energizing phase/fluid ratio is near the upper range of 3.0, the nitrogen/$CO_2$ ratio should be near the upper limit of its respective range, that is, about 0.5-0.6.

Figure 1:
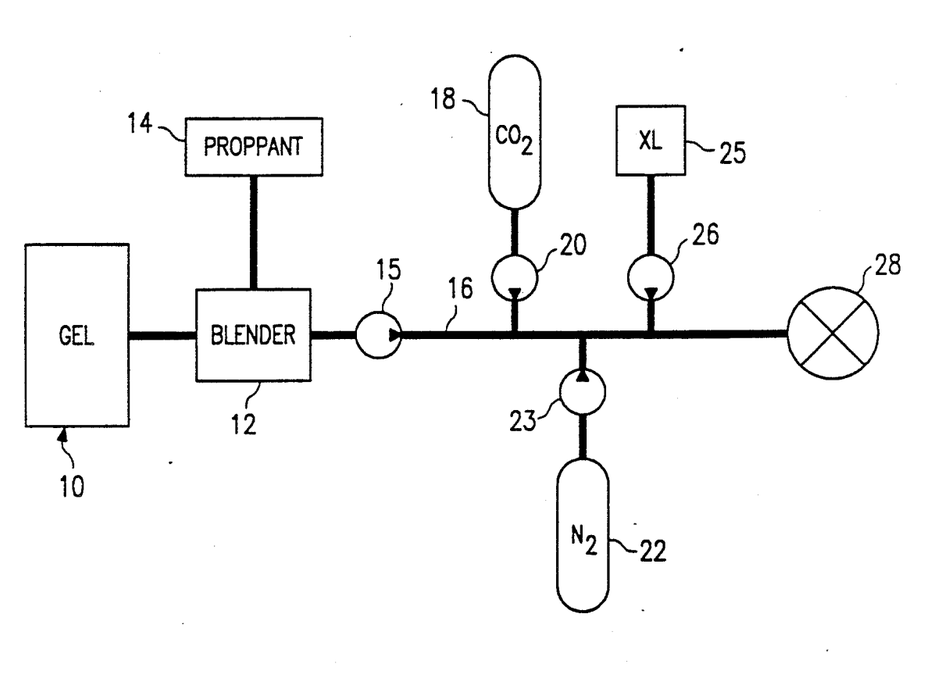
The drawing is a schematic representation of a surface mixing facility which may be used in the invention.

The drawing is a schematic illustration of surface equipment which may be used in implementing the process of the present invention. As shown, a storage or holding facility such as tank 10 contains a thickened aqueous liquid commonly referred to as a gel solution. Generally, this is prepared on site by any suitable technique. For example, water tank 10 may take the form of a holding tank. Water from any suitable source, e.g., one or more large storage tanks or reservoirs may be treated by the addition of polymers and other additives to be incorporated into the fracturing fluid and then passed to the tank 10 where it is held for a sufficient period of time, for example, 1-10 minutes to permit the polymeric thickening agent to undergo hydration. The gel solution is pumped from tank 10 to a blender 12 wherein proppant is mixed from a proppant hopper 14. The resulting slurry of proppant and aqueous gel solution is pumped to a high pressure treating line 16 which includes one or more high pressure pumps which increase the pressure of the fracturing liquid to the wellhead injection pressure. As a practical matter, the addition of polymeric thickening agents, and other additives incorporated therewith, hydration of the aqueous fluid to form the initial gel, and the addition of propping agent is carried out under ambient temperature and pressure conditions. The pressure of the fracturing fluid is then boosted to a pressure of about 100-200 psig for supply to the input of high pressure pumps 15. Liquid $CO_2$ which is under a pressure of several hundred psi is supplied from a storage vessel 18 to high pressure treating line 16 by a booster pump 20. The resulting $CO_2$ and aqueous phase are then combined with nitrogen gas from a nitrogen storage tank 22 supplied by pump 23, and a cross-linking agent and/or a foaming surfactant may be injected from a storage vessel 25 via pump 26.

The schematic diagram is for illustrative purposes only. The order of addition of $CO_2$ and nitrogen is not critical and may be reversed. Typically the cross-linking agent and foaming surfactant, if both are used, will be admixed in a single vessel. However, separate injection systems can be provided for these components. As a practical matter, the relative order of addition of propping agent depicted in the drawing must be observed in order to allow the propping agent to be introduced at substantially atmospheric pressure. Since the fracturing fluid should be gelled prior to the inclusion of a propping agent, the initial mixing and hydration likewise takes place at atmospheric pressure. Also, the surfactant often is added initially to the gel solution prior to the $CO_2$ and nitrogen. Preferably, the cross-linking agent, if it is utilized, is not added until all the other components are mixed. Earlier addition of the cross-linking agent may result in initiation of the cross-linking reaction and a premature increase in viscosity of the fracturing fluid, thereby unnecessarily increasing pumping requirements, as well as inhibiting good mixing or dispersion of the carbon dioxide and nitrogen in the gelled aqueous fluid. If desired, static mixers and turbulence inducing veins can be interposed in the process treatment line 16. However, generally the pumping of the fracturing fluid into the well tubular system, the tubing string or tubing casing annulus or both, will be sufficient to form a stabilized system.

Typically, $CO_2$ is supplied as a liquid at about $-10°$ F. to $10°$ F. at a pressure of about 250 to 350 psig. Nitrogen is supplied as a gas, normally at ambient temperature of from about $65°$ to $115°$ F. The composite fracturing fluid is at a pressure at the wellhead within the range of from about 1,000 to 20,000 psig.

Generally, the composition of the aqueous phase of the fracturing fluid used in the invention may include polymer gelling agents, surfactants, clay stabilizers, foaming agents, and salt. As noted previously, alcohol may be added to the fracturing fluid in those cases where the formation contains substantial quantities of hydratable clays. For example, it is often times desirable to add from about 10-20 volume percent methanol to the fracturing fluid in such circumstances. Other miscible alcohols such as ethyl alcohol or isopropyl alcohol may also be employed. Also, the alcohol may be employed in concentrations substantially in excess of 20 percent, although economic and safety considerations as noted previously usually will dictate against this.

Polymeric thickening agents useful in the formation of stable fracturing fluids are well known in the art and any suitable thickening agents may be used in the present invention. Examples of thickening gelling agents for use in the invention include those which contain one or more of the following functional groups: hydroxyl, carboxyl, sulfate, sulfonate, amino or amide. Polysaccharides and polysaccharide derivatives (which contain one or more of the monosaccharides such as glucose, galactose, manose, zilose, arabinose, fructose) are also useful. Examples of polysaccharide derivatives which are suitable in the practice of the present invention include: guar gum, derivatized guar such as HPG (hydroxypropyl guar), HEG (hydroxyethyl guar) and CMHPG (carboxymethyl hydroxy-propyl guar), cellulose and its derivatives such as CMHEC (carboxymethyl hydroxyethyl cellulose), xanthan gum and starch.

In addition, the gelling agents can also be synthetic polymers, copolymers and terpolymers. Examples of these synthetic polymers include, but are not limited to: polyacrylate, polymethylacrylate, polyacrylamide, including partially hydrolyzed polyacrylamide, acrylamide methyl propane sulfonic acid copolymers, polyvinyl alcohol, polyvinyl pyrole, maleic anhydride methyl vinyl ether copolymers.

Cross-linking agents which can be combined with the solution of polymeric thickening agents include multivalent metal ions such as titanium, zirconium, chromium, antinomy, iron, and aluminum. The cross-linking agents and polymers can be combined in any suitable fashion. These combinations include, but are not limited to: admixing guar and its derivatives as a polymer with a cross-linking agent of titanium, zirconium or borate; a polymer composition of cellulose and its derivatives cross-linked with titanium or zirconium; acrylamide methyl propane sulfonic acid copolymer cross-linked with zirconium. In general, the metal ion cross-linking agents are used in an amount of about 10 ppm to 200 ppm of polymer.

The amount of thickening agent utilized depends upon the desired viscosity of the aqueous phase and the amount of aqueous phase in relation to the energized phase, that is, the liquid carbon dioxide and nitrogen phase. As the amount of liquid carbon dioxide and nitrogen increases, the amount of aqueous phase will, of course, decrease. Usually in accordance with the aforementioned ratio of energizing phase to liquid phase, the amount of liquid carbon dioxide and nitrogen is from about 60% to 75% with the remaining 40% to 25% being the aqueous phase. The amount of liquid carbon dioxide in the system is usually above 35 but less than 50 volume percent and is generally from about 40 to 50 volume percent. Nitrogen usually ranges from about 15 to about 35 volume percent of the total system. The nitrogen volume should be about 15% or more in order to alleviate scaling tendencies, promote stability and provide the initial expulsive force as discussed above. Ratios of components representative of the present invention include, but are not limited to, 20:40:40, 15:45:40, 20:45:35 and 25:45:30 of $N_2:CO_2:H_2O$.

As discussed previously, the carbon dioxide and nitrogen volumes are dependent upon wellhead conditions including temperature and pressure. Actual surface injection rates of the three components will vary from the system ratio due to the solubility of carbon dioxide and nitrogen in water. Nitrogen solubility is very low in the total system. Carbon dioxide solubility can vary substantially as a function of temperature and pressure and can be determined using standard solubility curves. For example, carbon dioxide solubility is addressed in Kirk Othmer, *Encyclopedia of Chemical Technology*, John Wiley & Sons, 3rd Edition, Vol. 4, pp. 725-728 (1978), "Carbon Dioxide—Physical Properties", and for a further consideration of carbon dioxide solubility characteristics, reference is made to this article.

As discussed above, changes in nitrogen volume conform closely to the General Gas Law equation. Table I illustrates percent variations in nitrogen volume from surface conditions to reservoir conditions. Values in parenthesis indicate a volumetric contraction. All other values indicate expansion. Conditions which would most closely resemble actual job conditions are underlined.

TABLE I

| VOLUMETRIC CHANGE FROM SURFACE TO RESERVOIR CONDITIONS FOR NITROGEN | | | | |
|---|---|---|---|---|
| Reservoir Temperature degrees F. | Reservoir Pressure, psi | | | |
| | 3000 | 5000 | 7000 | 10,000 |
| Surface Treating Pressure = 3000 psi Temperature = 60 degrees F. | | | | |
| 100 | 8.6 | (26.7) | (41.3) | |
| 150 | 19.8 | (20.0) | (36.5) | |
| 200 | 30.9 | 13.4 | (31.9) | |
| Surface Treating Pressure = 5000 psi Temperature = 60 degrees F. | | | | |
| 100 | 60.0 | 8.0 | (13.5) | (29.1) |
| 150 | 76.5 | 17.9 | (6.5) | (24.2) |
| 200 | 92.9 | 27.7 | 0.4 | (19.5) |
| Surface Treating Pressure = 7000 psi Temperature = 60 degrees F. | | | | |
| 100 | | 33.4 | 6.9 | (12.4) |
| 150 | | 45.7 | 15.6 | (6.4) |
| 200 | | 57.7 | 24.0 | (0.6) |
| Surface Treating Pressure = 10000 psi Temperature = 60 degrees F. | | | | |
| 100 | | | 27.8 | 4.6 |
| 150 | | | 38.1 | 11.8 |
| 200 | | | 48.2 | 18.8 |

Of course, Table I is not intended to present all possible variations, but simply illustrates certain changes which may occur in the application of the invention.

Table IIa illustrates typical well data which may used be to design a fracturing job. Table IIb illustrates an eight stage fracturing procedure for the well depicted in Table IIa. The number of stages can be varied as desired. Of the stages illustrated, the first stage provides the pad, in stages 2 through 7 the amount of proppant carried to the formation is gradually increased, and stage 8 is proppant free. The staged operation is utilized to convey increasing quantities of proppant to the formation as the fracturing process produces more and larger fractures.

TABLE IIa

Well Depth Perforated Internal - 9000 ft
Bottom hole frac pressure - 6300 psi
$CO_2$ transport pressure - 250 psi
Friction pressure loss - 150 psi/1000 ft
Temperature of $N_2$ at surface - 100° F.
Total slurry treatment volume - 92,311 gal TABLE IIa-continued Treating conductor ID - 4.778 inches
Bottom hole static temp - 180° F.
Average formation pumping temperature - 157° F.
Aqueous gel temperature in tanks - 80° F.
Fluid specific gravity - 1.011
Foam injection rate - 40 BPM
Flush volume - 8300 gal
Flush quality as nitrogen - .20
Flush quality as $CO_2$ - .45

| | | |
|---|---|---|
| $CO_2$ discharge temperature | 6° F. (low) | 12° F. (high) |
| Foam temperature at surface | 52° F. (low) | 55° F. (high) |
| Foam temperature at perfs | 62° F. (low) | 65° F. (high) |

TABLE IIb

| STAGE # | STAGE VOLUME (GAL) | FOAM QUALITY AS $CO_2$ (DECIMAL) | FOAM QUALITY AS $N_2$ (DECIMAL) | PROPPANT CONCENTRATION LB/GAL | MESH SIZE | PROPPANT |
|---|---|---|---|---|---|---|
| 1 | 25000 | .45 | .20 | 0 | PAD | — |
| 2 | 10000 | .45 | .20 | 1 | 20-40 | SAND |
| 3 | 15000 | .45 | .20 | 1.5 | 20-40 | SAND |
| 4 | 10000 | .45 | .20 | 2.0 | 20-40 | SAND |
| 5 | 8000 | .45 | .20 | 2.5 | 20-40 | SAND |
| 6 | 6000 | .45 | .20 | 3.0 | 20-40 | SAND |
| 7 | 5000 | .45 | .20 | 4.0 | 20-40 | SAND |
| 8 | 8300 | .45 | .20 | 0.0 | Flush | — |

Table IIb represents the desired make up of the fracturing fluid to the formation. Utilizing this design requirement and based upon the information set forth in Table IIa, various volumes and flow rates for the components can be determined as set forth in Tables IIIa-f.

TABLE IIIa

| STAGE # | FOAM VOLUME (GAL.) | DESIGN PROP CONC (PPG) | TOTAL SURFACE RATE (BPM) | CLEAN FOAM RATE (BPM) | CLEAN GEL RATE (BPM) | $N_2$ RATE (SCFM) | $CO_2$ RATE (BPM) | PROP RATE (LB/MIN) |
|---|---|---|---|---|---|---|---|---|
| 1 | 25000 | 0.0 | 40.0 | 40.0 | 14.0 | 11893 | 18.8 | 0 |
| 2 | 10000 | 1.0 | 40.0 | 38.3 | 13.4 | 10762 | 18.0 | 1607 |
| 3 | 15000 | 1.5 | 40.0 | 37.5 | 13.1 | 10235 | 17.6 | 2359 |
| 4 | 10000 | 2.0 | 40.0 | 36.7 | 12.8 | 9732 | 17.2 | 3081 |
| 5 | 8000 | 2.5 | 40.0 | 35.9 | 12.6 | 9254 | 16.9 | 3772 |
| 6 | 6000 | 3.0 | 40.0 | 35.2 | 12.3 | 9076 | 16.5 | 4436 |
| 7 | 5000 | 4.0 | 40.0 | 33.9 | 11.9 | 7942 | 15.9 | 5688 |
| 8 | 8300 | 0.0 | 40.0 | | 14.0 | 11890 | 18.8 | 0 |

TABLE IIIb

| | STAGE TOTALS | | | | | CUMULATIVE TOTALS | | | | |
|---|---|---|---|---|---|---|---|---|---|---|
| STAGE # | FLUID (BBL) | PROP (LB) | $CO_2$ (BBL) | $CO_2$ (TONS) | $N_2$ (MSCF) | FLUID (BBL) | PROP (LB) | $CO_2$ (BBL) | $CO_2$ (TONS) | $N_2$ (MSCF) |
| 1 | 208 | 0 | 280 | 50 | 176.98 | 208 | 0 | 280 | 50 | 176.98 |
| 2 | 83 | 10000 | 112 | 20 | 66.97 | 292 | 10000 | 392 | 70 | 243.95 |
| 3 | 125 | 22500 | 168 | 30 | 97.60 | 417 | 32500 | 559 | 100 | 341.54 |
| 4 | 83 | 20000 | 112 | 20 | 63.18 | 500 | 52500 | 671 | 120 | 404.73 |
| 5 | 67 | 20000 | 89 | 16 | 49.06 | 567 | 72500 | 760 | 136 | 453.79 |
| 6 | 50 | 18000 | 67 | 12 | 36.82 | 617 | 90500 | 827 | 148 | 490.62 |
| 7 | 42 | 20000 | 56 | 10 | 27.92 | 658 | 110500 | 883 | 158 | 518.54 |
| 8 | 69 | 0 | 93 | 17 | 58.74 | 728 | 110500 | 976 | 175 | 577.28 |

TABLE IIIc

FRAC PROCEDURE FOR $CO_2/N_2$ FOAM

| STAGE # | FOAM VOLUME (GALS) | TOTAL FOAM QUALITY | SURF RATE (BPM) | PROPPANT CONC. (PPG) | PROPPANT MESH | PROPPANT TYPE | PROPPANT LBS | GEL VOLUME (BBLS) | $CO_2$ CONC. (SCF/BBL) |
|---|---|---|---|---|---|---|---|---|---|
| 1 | 25000 | 65.0 | 40.0 | 0.0 | PAD | | 0 | 208 | 4072 |
| 2 | 10000 | 65.0 | 40.0 | 1.0 | 20-40 | SAND | 10000 | 83 | 4043 |
| 3 | 15000 | 65.0 | 40.0 | 1.5 | 20-40 | SAND | 22500 | 125 | 4029 |
| 4 | 10000 | 65.0 | 40.0 | 2.0 | 20-40 | SAND | 20000 | 83 | 4015 |
| 5 | 8000 | 65.0 | 40.0 | 2.5 | 20-40 | SAND | 20000 | 67 | 4001 |

TABLE IIIc-continued

FRAC PROCEDURE FOR $CO_2/N_2$ FOAM

| STAGE # | FOAM VOLUME (GALS) | TOTAL FOAM QUALITY | SURF RATE (BPM) | PROPPANT CONC. (PPG) | MESH | TYPE | LBS | GEL VOLUME (BBLS) | $CO_2$ CONC. (SCF/BBL) |
|---|---|---|---|---|---|---|---|---|---|
| 6 | 6000 | 65.0 | 40.0 | 3.0 | 20–40 | SAND | 18000 | 50 | 4001 |
| 7 | 5000 | 65.0 | 40.0 | 4.0 | 20–40 | SAND | 20000 | 42 | 3959 |
| 8 | 8300 | 65.0 | 40.0 | 0.0 | FLUSH | — | 0 | 69 | 4072 |

TABLE IIId

TREATING SCHEDULE

| STAGE # | PROPPANT CONC. FOAM (PPG) | PROPPANT CONC. BLNDR (PPG) | CLEAN GEL RATE (BPM) | BLNDR SLURRY RATE (BPM) | SLURRY VOLUME (NO $CO_2/N_2$) (BBLS) | SLURRY VOLUME (CUM.) | $N_2$ STG. RATE (SCFM) | $CO_2$ STG. RATE (BPM) | $CO_2$ TONS PER STG. | $CO_2$ CUM. TONS | STAGE PUMP TIME HR:MIN:SEC |
|---|---|---|---|---|---|---|---|---|---|---|---|
| 1 | 0.0 | 0.0 | 14.0 | 14.0 | 208 | 208 | 11893 | 18.8 | 50 | 50 | 0:14:53 |
| 2 | 1.0 | 2.9 | 13.4 | 15.1 | 94 | 302 | 10762 | 18.0 | 20 | 70 | 0:6:14 |
| 3 | 1.5 | 4.3 | 13.1 | 15.7 | 149 | 452 | 10235 | 17.6 | 30 | 100 | 0:9:33 |
| 4 | 2.0 | 5.7 | 12.8 | 16.2 | 105 | 557 | 9732 | 17.2 | 20 | 120 | 0:6:30 |
| 5 | 2.5 | 7.1 | 12.6 | 16.6 | 88 | 645 | 9254 | 16.9 | 16 | 136 | 0:5:19 |
| 6 | 3.0 | 8.6 | 12.3 | 17.1 | 69 | 714 | 9076 | 16.5 | 12 | 148 | 0:4:4 |
| 7 | 4.0 | 11.4 | 11.9 | 18.0 | 63 | 778 | 7942 | 15.9 | 10 | 158 | 0:3:31 |
| 8 | 0.0 | 0.0 | 14.0 | 14.0 | 69 | 847 | 11890 | 18.8 | 17 | 175 | 0:4:57 |

TABLE IIIe

| STAGE # | TREAT PRESS (PSI) | $CO_2$ SOL SCF/BBL | SURFACE $CO_2/N_2$/TOT | PERFORATIONS $CO_2/N_2$/TOT | FORMATION $CO_2/N_2$/TOT | STG. PUMP TIME HR:MIN:SEC | TOTAL PUMP TIME HR:MIN:SEC |
|---|---|---|---|---|---|---|---|
| 1 | 4248 | 174 | 45/20/65 | 46/17/63 | 49/18/67 | 0:14:53 | 0:14:53 |
| 2 | 3934 | 172 | 45/20/65 | 47/16/63 | 47/16/63 | 0:6:14 | 0:21:7 |
| 3 | 3785 | 171 | 45/20/65 | 47/16/63 | 47/15/62 | 0:9:33 | 0:30:39 |
| 4 | 3641 | 170 | 45/20/65 | 47/15/62 | 46/15/61 | 0:6:30 | 0:37:8 |
| 5 | 3502 | 169 | 45/20/65 | 47/15/62 | 45/14/59 | 0:5:19 | 0:42:26 |
| 6 | 3500 | 169 | 45/20/65 | 47/15/62 | 44/14/58 | 0:4:4 | 0:46:30 |
| 7 | 3112 | 166 | 45/20/65 | 47/14/61 | 43/12/55 | 0:3:31 | 0:50:1 |
| 8 | 4246 | 174 | 45/20/65 | 46/17/63 | | 0:4:57 | 0:54:57 |

TABLE IIIf

SLURRY QUALITY

| STAGE # | SURFACE $CO_2/N_2$/TOT | PERFORATIONS $CO_2/N_2$/TOT | FORMATION $CO_2/N_2$/TOT |
|---|---|---|---|
| 1 | 45/20/65 | 46/16/62 | 49/17/66 |
| 2 | 47/19/66 | 49/15/64 | 51/16/67 |
| 3 | 48/18/66 | 50/14/64 | 52/15/67 |
| 4 | 49/18/67 | 51/13/64 | 53/14/67 |
| 5 | 50/17/67 | 52/13/65 | 54/14/68 |
| 6 | 51/17/68 | 53/12/65 | 55/13/68 |
| 7 | 53/16/69 | 56/11/67 | 57/12/69 |
| 8 | 45/20/65 | 46/26/62 | 49/17/66 |

In practicing the invention, it is highly desirable to achieve an aqueous phase which has uniformly dispersed therein the energized phase of liquid carbon dioxide and gaseous nitrogen. The mixing necessary to obtain uniform dispersion of carbon dioxide and nitrogen within the aqueous phase can be achieved in the course of the pumping of the fracturing fluid down the well tubulars.

Any suitable surfactants may be used in the present invention in order to stabilize the fracturing fluid from the surface conditions to the formation conditions at the conclusion of the fracturing operation. Cationic, anionic, nonionic, or amphoteric surfactants may be used to produce a stable dispersion and foam. The surfactants used for the practice of the present invention include, but are not limited to, the following: alkyl quaternary amines, betaines, sulfated alkoxylates, alkylaryl sulfuonates, ethoxylated linear alcohols, alpha-olefin sulfonates, fluorinated alkyl quaternary amines, ethoxylated fluorocarbon alcohols, ethoxylated fatty acids, quaternary amine ethoxylates, sulfonsuccinates, ethoxylated alkyl quaternary amines, alkanolamide ethoxylates, and nonylphenol ethoxylates.

Additionally, the aqueous phase may contain other additives routinely used in industry practice. For example, besides polymers, cross-linking agents, catalysts, and surfactants, the aqueous phase may also contain the following additional components: biocides, surface tension reducing non-emulsifying surfactants, clay control agents, salts, fluid loss additives, buffers, gel breakers, iron control agents, paraffin inhibitors and, as discussed above, alcohols.

Preliminary to carrying out the present invention, water is first placed in storage tanks. Additives can be added to the fracturing fluid continuously in the course of the fracturing operation or the gelled fluid can be formulated before the operation and kept in storage tanks until needed. Additives as described above may then be blended into the water in the tanks. A foaming agent may be added to the water in the storage tanks at this time or it may be added at a location in the treating line near the wellhead. Once the additives are thoroughly blended with the water and the water "gelled", the thickened aqueous is transferred from the storage tanks to a blender. Proppant, when required, can be added to a mixing tub attached to the blender at such a rate as to achieve the required concentration, that is, pounds added per gallon of liquid, to obtain the appropriate downhole concentration. The treating fluid or gel-proppant slurry is transferred by means of transfer pumps at a low pressure, usually about 100 psi, to high pressure, generally greater than 500 psi, tri-plex pumps. The flow rate of transfer is such to provide a continuous supply of liquid or slurry to the tri-plex pumps. Should the transfer rate be greater than the supply rate required by the tri-plex pumps, the excess is returned to a blender tub. The tri-plex pumps inject the liquid or slurry into the treating line, which is connected directly to the wellhead at a desired rate and at a pressure required to hydraulically fracture the formation.

The foaming agent does not necessarily have to be blended into the storage tanks prior to the job, but may be added to the treating line at a point between the tri-plex pump connected to the treating line closest to the wellhead and the wellhead itself. Actual injection is achieved using a high pressure injection pump at such a rate as to attain a stable foam, after the addition of the carbon dioxide and nitrogen, at wellhead conditions. The stable foam maintains specified rheological properties at reservoir and treatment conditions, more specifically, the foam has a half-life greater than or equal to the duration of the fracturing treatment. The term half-life as used herein means the time it takes for one-half of the water content of the foam to separate from the energized phase. The rheological properties are specified prior to the fracturing treatment and are dependent on reservoir conditions and results desired, i.e., fracture geometry and proppant transport capabilities as determined prior to the beginning of the treatment.

At a point in the treating line closer to the wellhead than the closest union with a tri-plex pump and, when applicable, closer than the location of the foaming agent injection, carbon dioxide and nitrogen are introduced. Carbon dioxide is introduced in the liquid phase and nitrogen in the gaseous phase. Typically, the carbon dioxide is injected before the nitrogen, or the reverse order of addition may be employed.

The combined slurry (gel/proppant carbon dioxide and nitrogen) enters the wellhead and the well tubulars. The agitation and shear required to uniformly disperse the carbon dioxide and nitrogen within the gel/proppant mixture is provided by the turbulence within the well tubulars.

The present invention is particularly well suited to those formations which in situ water has a tendency to produce carbonate scale. The mixture of $CO_2$ and nitrogen provided by the present invention will reduce scaling tendencies by reducing the quantity of carbon dioxide that can be converted to a carbonate scale. Further, the combination gives a rapid clean up as described previously.

Having described specific embodiments of the present invention, it will be understood that modifications thereof may be suggested by those skilled in the art, and it is intended to cover all such modifications as fall within the scope of the appended claims.

I claim:

1. In a method for the hydraulic fracturing of a subterranean formation penetrated by a well, the steps comprising:
   (a) providing an aqueous fracturing fluid for use in hydraulic fracturing of said formation;
   (b) incorporating carbon dioxide and nitrogen into said aqueous fracturing fluid, in relative amounts to provide at the wellhead temperature and pressure conditions of said well a composite fracturing fluid having a volume ratio of nitrogen to carbon dioxide within the range of 0.2-1.0 and a volume ratio of carbon dioxide and nitrogen to said aqueous fracturing fluid within the range of 1-4; and
   (c) injecting said composite aqueous fracturing-fluid into said well under a pressure sufficient to implement said hydraulic fracturing of said formation.

2. The method of claim 1, wherein the volume ratio of nitrogen to carbon dioxide is within the range of 0.2-0.8.

3. The method of claim 1, wherein said carbon dioxide is incorporated into said fracturing fluid in a liquid phase and said nitrogen is incorporated into said fracturing fluid in a gaseous phase.

4. The method of claim 1, wherein propping agent is incorporated into said aqueous fracturing fluid.

5. The method of claim 4, wherein said propping agent is incorporated into said fracturing fluid prior to incorporation of said carbon dioxide and nitrogen 6. The method of claim 1, further comprising the step of adding a thickening agent to said fracturing fluid.

7. The method of claim 5, wherein said thickening agent is a cross-linkable polymer and further comprising the step of incorporating a cross-linking agent into said fracturing fluid.

8. The process of claim 1, wherein the volume ratio of nitrogen to carbon dioxide at said wellhead temperature and pressure conditions is within the range of 0.3-0.6.

9. The method of claim 8, wherein the volume ratio of carbon dioxide and nitrogen to the aqueous fracturing fluid at said wellhead temperature and pressure conditions is within the range of 1.5-3.0.

10. In a method for the hydraulic fracturing of a subterranean formation penetrated by a well, the steps comprising:
    (a) providing an aqueous fracturing fluid for use in hydraulic fracturing of said formation;
    (b) incorporating carbon dioxide and nitrogen into said aqueous fracturing fluid in relative amounts to provide at the wellhead temperature and pressure conditions of said well a composite fracturing fluid having a volume ratio of nitrogen to carbon dioxide within the range of 0.2-1.0, said nitrogen being added in an amount to provide a nitrogen concentration in said composite fracturing fluid of at least 15 volume percent at said wellhead conditions; and
    (c) injecting said composite aqueous fracturing fluid into said well under a pressure sufficient to implement said hydraulic fracturing of said formation.

11. The method of claim 10, wherein the volume ratio of nitrogen to carbon dioxide is within the range of 0.2-0.8.

12. The method of claim 10, wherein said carbon dioxide is incorporated into said fracturing fluid in a liquid phase and said nitrogen is incorporated into said fracturing fluid in a gaseous phase.

13. The method of claim 10, wherein propping agent is incorporated into said aqueous fracturing fluid.

14. The method of claim 13, wherein said propping agent is incorporated into said fracturing fluid prior to incorporation of said carbon dioxide and nitrogen.

15. The method of claim 14, further comprising the step of incorporating a thickening agent into said fracturing fluid.

16. The method of claim 15, wherein said thickening agent is a cross-linkable polymer and further comprising the step of incorporating a cross-linking agent into said fracturing fluid.

17. The process of claim 10, wherein the volume ratio of nitrogen to carbon dioxide at said wellhead temperature and pressure conditions is within the range of 0.3-0.6.

18. The method of claim 17, wherein the volume ratio of carbon dioxide and nitrogen to water at said wellhead temperature and pressure conditions is within the range of 1.5-3.0.

19. In a method for the hydraulic fracturing of a subterranean formation penetrated by a well, the steps comprising:
   (a) incorporating a thickening agent into an aqueous fluid to provide a viscous aqueous fracturing fluid;
   (b) incorporating a propping agent into said viscous aqueous fracturing fluid;
   (c) subsequent to step (b), separately incorporating carbon dioxide and nitrogen into said aqueous fracturing fluid, said carbon dioxide and nitrogen being added in relative amounts to provide at the wellhead temperature and pressure conditions of said well a volume ratio of nitrogen to carbon dioxide within the range of 0.2-1.0 and said nitrogen being added in an amount to provide a nitrogen concentration in said composite fracturing fluid of at least 15 volume percent at said wellhead conditions; and
   (d) injecting said composite fracturing fluid into said well under a pressure sufficient to implement said hydraulic fracturing of said formation.

20. The method of claim 19, wherein the volume ratio of nitrogen to carbon dioxide at said wellhead conditions or temperature and pressure is within the range of 0.2-0.8.

21. The method of claim 19, wherein the volume ratio of carbon dioxide and nitrogen to said aqueous fracturing fluid is within the range of 1-4.

22. The method of claim 19, wherein said carbon dioxide is incorporated into said fracturing fluid in a liquid phase and said nitrogen is incorporated into said fracturing fluid in a gaseous phase.

23. The method of claim 19, wherein said thickening agent is a cross-linkable polymer and further comprising the step of incorporating a cross-linking agent into said fracturing fluid.

24. The method of claim 23, wherein said cross-linking agent is incorporated into said fracturing fluid subsequent to steps (a) and (b).

25. The process of claim 19, wherein the volume ratio of nitrogen to carbon dioxide at said wellhead temperature and pressure conditions is within the range of 0.3-0.6.

26. The method of claim 25, wherein the volume ratio of carbon dioxide and nitrogen to said aqueous fracturing fluid at said wellhead temperature and pressure conditions is within the range of 1.5-3.0.

* * * * *

UNITED STATES PATENT AND TRADEMARK OFFICE
CERTIFICATE OF CORRECTION

PATENT NO. : 5,069,283

DATED : December 3, 1991

INVENTOR(S) : David J. Mack

It is certified that error appears in the above-identified patent and that said Letters Patent is hereby corrected as shown below:

Column 10, line 49, delete "8.6" and insert therefore --8.6--.

Column 10, line 49, delete "(26.7)" and insert therefore --(26.7)--.

Column 10, line 50, delete "19.8" and insert therefore --19.8--.

Column 10, line 50, delete "(20.0)" and insert therefore --(20.0)--.

Column 10, line 50, delete "(36.5)" and insert therefore --(36.5)--.

Column 10, line 54, delete "76.5" and insert therefore --76.5--.

Column 10, line 54, delete "17.9" and insert therefore --17.9--.

Column 10, line 54, delete "(6.5)" and insert therefore --(6.5)--.

Column 10, line 55, delete "27.7" and insert therefore --27.7--.

Column 10, line 55, delete "0.4" and insert therefore --0.4--.

UNITED STATES PATENT AND TRADEMARK OFFICE
CERTIFICATE OF CORRECTION

PATENT NO. : 5,069,283                                   Page 2 of 3
DATED      : December 3, 1991
INVENTOR(S): David J. Mack It is certified that error appears in the above-identified patent and that said Letters Patent is hereby corrected as shown below:

Column 10, line 55, delete "(19.5)" and insert therefore --(19.5)--.

Column 10, line 58, delete "45.7" and insert therefore --45.7--.

Column 10, line 58, delete "15.6" and insert therefore --15.6--.

Column 10, line 58, delete "(6.4)" and insert therefore --(6.4)--.

Column 10, line 59, delete "57.7" and insert therefore --57.7--.

Column 10, line 59, delete "24.0" and insert therefore --24.0--.

Column 10, line 59, delete "(0.6)" and insert therefore --(0.6)--.

Column 10, line 63, delete "38.1" and insert therefore --38.1--.

Column 10, line 63, delete "11.8" and insert therefore --11.8--.

Column 10, line 64, delete "48.2" and insert therefore --48.2--.

UNITED STATES PATENT AND TRADEMARK OFFICE
CERTIFICATE OF CORRECTION

PATENT NO. : 5,069,283

DATED : December 3, 1991

INVENTOR(S) : David J. Mack

It is certified that error appears in the above-identified patent and that said Letters Patent is hereby corrected as shown below:

Column 10, line 64, delete "18.8" and insert therefore --18.8--.

Signed and Sealed this

Sixteenth Day of March, 1993

Attest:

STEPHEN G. KUNIN

*Attesting Officer*   Acting Commissioner of Patents and Trademarks